Figure 1:
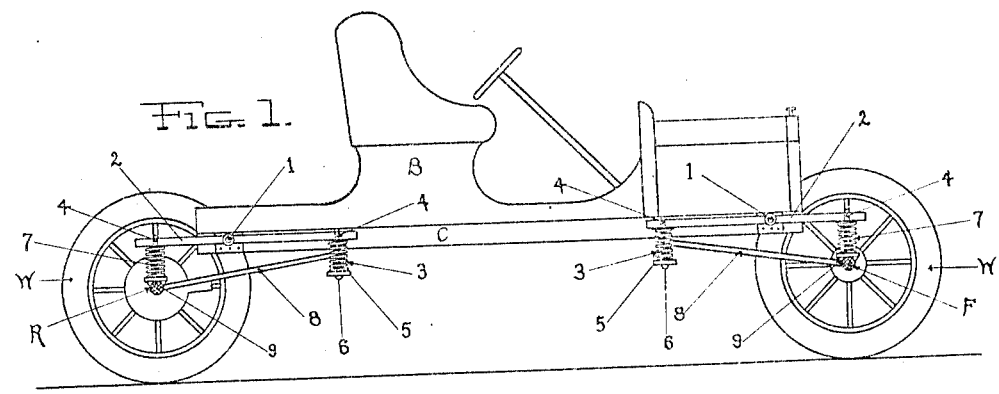

N. H. LINES.
AUTOMOBILE SHOCK ABSORBER.
APPLICATION FILED DEC. 28, 1911.

1,079,249.

Patented Nov. 18, 1913.

Witnesses
H. L. Douglass
C. E. Richards

Inventor
Newton H. Lines

UNITED STATES PATENT OFFICE

NEWTON H. LINES, OF ARAPAHOE, NEBRASKA.

AUTOMOBILE SHOCK-ABSORBER.

1,079,249.

Specification of Letters Patent.  Patented Nov. 18, 1913.

Application filed December 28, 1911.  Serial No. 668,379.

*To all whom it may concern:*

Be it known that I, NEWTON H. LINES, a citizen of the United States, residing at Arapahoe, in the county of Furnas and State of Nebraska, have invented certain new and useful Improvements in Automobile Shock-Absorbers; and I do declare the following to be a full, clear, and exact description of the invention, such as will enable others skilled in the art to which it appertains to make and use the same.

This invention relates to vehicles, and more especially to automobiles.

The object of the same is to produce an improved shock absorber, to be attached to the frame or chassis of an automobile.

The objects of this invention are carried out in a number of ways whereof my preferred embodiment is described in the following specifications, set forth in the claim, and shown in the drawings wherein—

Figure 2:
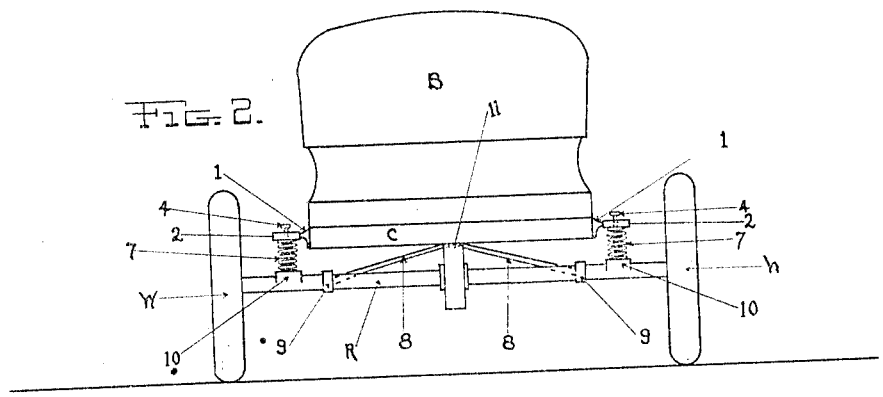
Figure 3:
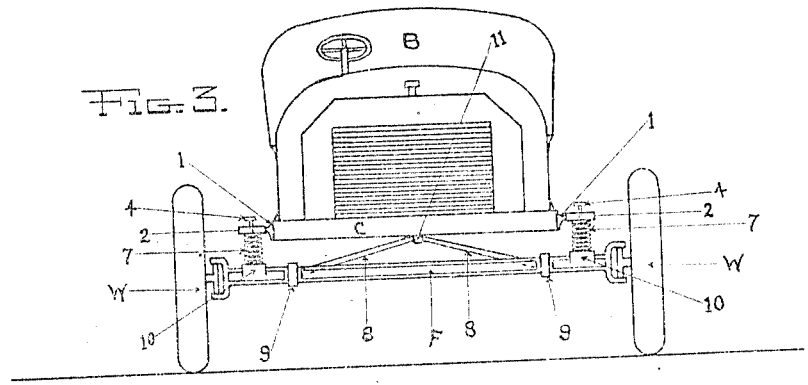

Figure 1 is a side view of an automobile with my invention applied, partly broken away and in section; Fig. 2 is a rear view, and Fig. 3 is a front view.

In the drawings the automobile body B is mounted upon a frame or chassis C and supported by wheels W. As is well known these machines travel along the road and carry their own motive power and passengers and freight. As is also well known to engineers experienced in this art, the load of the chassis and all it carries is ordinarily communicated to the axles by means of springs which are normally under some tension, and which are further compressed when the wheel strikes an obstruction in the road. If the obstruction or depression be of average size a well-tempered spring will stand the shock; but owing to the small size of the wheel generally used on automobiles, and the speed at which they are driven, if the obstruction or depression be a little more pronounced than is ordinarily encountered, one or more of the leaves of the spring or springs are liable to be broken. This condition has given rise to what are called "shock absorbers" which come into play when the spring is abnormally compressed or expanded.

The present invention is designed to apply to an automobile a shock absorbing device in the form of a lever of the first class, connected to the chassis and the axles by a system of springs.

The preferred embodiment of my idea will now be set forth.

Each corner of the chassis C is by preference sustained by a lever of the first class whose fulcrum is between its power and its load. To this end the numeral 1 designates a bracket or stub attached to, and projecting from the chassis near its corner; and 2 is a lever of the first class whose fulcrum is between its extremities, the load and weight of the chassis is carried by this lever sustained by a compression spring 3 of the coil pattern connected to the chassis and the lever at the inner end of said lever, and by a compression spring 7 of the same pattern connected to the axles F and R. As a check device to prevent said springs from undue expansion a bolt or rod 6 is connected with the base or member 5 on which said springs rest, and extends up through said springs and lever to an enlarged head 4 which may be made of rubber, but which must be large enough to strike the top of said lever when this check device comes into play. The power of a lever of this character is here represented by the axles F and R over which the outer end of the lever extends, the same being connected by a compression spring 7 and a similar check device to limit the recoil. By preference brace rods 8 are connected to the axles F and R at point 9 by a hinge or pivot joint, and to the frame or chassis by a ball joint 11, the object of said braces is to maintain the relative position of all parts, and to take the side and end motion of the body off of the levers 2. Under ordinary conditions the weight of the load bears down upon the fulcrum and compresses springs 3 and 7 slightly; but when the wheel W encounters an obstruction in the road and suddenly rises, the axle becomes the power and spring 7 is compressed, each lever turns around its fulcrum, and compresses springs 3 and thus reduces the jar which would otherwise be transmitted to the chassis. By this device the shock is so distributed and absorbed that but very little is transmitted to the chassis. Springs 3 are attached to the chassis by means of a bracket that is fastened to the chassis by two bolts, and extends downward about eight inches and outward about five inches, the outer end of said bracket acts as a seat for spring 3 to rest on. Springs 7 are fastened to seat 10 which in turn is attached to the axles F and R.